(12) United States Patent
Park

(10) Patent No.: US 11,980,797 B2
(45) Date of Patent: May 14, 2024

(54) DIGITAL SLOPE METER

(71) Applicant: Sun Joo Park, North York (CA)

(72) Inventor: Sun Joo Park, North York (CA)

(*) Notice: Subject to any disclaimer, the term of this patent is extended or adjusted under 35 U.S.C. 154(b) by 382 days.

(21) Appl. No.: 17/319,640

(22) Filed: May 13, 2021

(65) Prior Publication Data

US 2022/0362644 A1 Nov. 17, 2022

(51) Int. Cl.
*A63B 60/46* (2015.01)
*A63B 69/36* (2006.01)
*G01B 11/26* (2006.01)

(52) U.S. Cl.
CPC .......... *A63B 60/46* (2015.10); *A63B 69/3676* (2013.01); *G01B 11/26* (2013.01)

(58) Field of Classification Search
CPC . A63B 60/46; A63B 69/3676; A63B 2220/18; A63B 2220/20; G01B 11/26; G01C 9/10
USPC ................ 473/296, 298, 299, 404, 407, 221
See application file for complete search history.

(56) References Cited

U.S. PATENT DOCUMENTS

| 6,547,680 | B1 | 4/2003 | Marchese, Jr. |
| 7,306,524 | B1* | 12/2007 | Rogers ............... A63B 24/0021 473/167 |
| 7,987,693 | B2* | 8/2011 | Fry ........................ G01N 19/02 73/9 |
| 9,320,958 | B2* | 4/2016 | Yoo ..................... A63B 69/3658 |
| 2004/0097303 | A1* | 5/2004 | Hughes .................. A63B 57/00 473/404 |

* cited by examiner

*Primary Examiner* — Nini F Legesse
(74) *Attorney, Agent, or Firm* — IPLA P.A.

(57) ABSTRACT

A digital slope meter includes: a shaft extended in a longitudinal direction thereof and having a rolling groove formed on top thereof in the longitudinal direction thereof to allow a golf ball placed thereon to be moved down therealong, when the rear side thereof is tilted up in a state where the front side there is located on a green, and to then roll on the green from a discharging end formed at the front end thereof; and a measuring module located on the shaft to measure a moving distance and an isolated angle of the golf ball rolling on the green from the discharging end when the rear side of the shaft is tilted up.

5 Claims, 8 Drawing Sheets

DIGITAL SLOPE METER

BACKGROUND

The present invention relates to a digital slope meter, and more particularly, to a bar-shaped device, that is, digital slope meter that is capable of allowing a slope speed at a given point of a green, on which a hole cup is located on a golf course, to be checked from a digital device mounted thereon, thereby measuring the slope of the green.

Generally, a Stimpmeter is a device used to measure the speed of greens on a golf course with hole cups located thereon, and in specific, the Stimpmeter in advance measures the green speed varying according to heights of the lawn constituting the green and the mowing direction of the lawn so as to help a golfer putt a golf ball stably.

The method using the Stimpmeter is simple, and a conventional Stimpmeter 101 as shown in FIG. 1 is disclosed in U.S. Pat. No. 6,547,680. According to the conventional Stimpmeter 101, a golf ball B is placed on a locking groove of the Stimpmeter 101 located on top of a green G whose speed is measured, and if the rear side of a shaft 3 of the Stimpmeter 101 is slowly tilted up, the golf ball B rolls down a rolling groove 105 formed on the shaft 3 at a point where an inclined angle q is 30°, moves along the green G, and stops at an arbitrary point.

Next, the distance from the front end of the shaft 3 up to the golf ball B is measured by a user with a measuring tool like a measuring tape, and for example, the moving distance is measured three times in the same directions, three times in opposite directions, that is, total six times, thereby obtaining an average distance to allow the green speed to be recognized by the user.

In the case of the conventional Stimpmeter 101, whenever the golf ball B rolls, the moving distance up to the golf ball B has to be measured manually by the user with the measuring tool, so that undesirably, the measuring work of the green speed is done very complicatedly, the measurement result is not accurate, and relatively long measurement time is required.

According to the conventional Stimpmeter 101, further, it is assumed that the moving distances up to the golf ball B which are measured at two different measurement points of the green G are the same as each other, and in the case where an isolated angle of the golf ball B from an imaginary line extended from the axial line of the shaft 3, that is, a line connected from the front end of the shaft 3 up to the golf ball B is called a moving line, even if the angles formed by the moving line and the imaginary line are different at the two measurement points, it is undesirably misunderstood that the states of the green G at the two measurement points are the same as each other. When the state of the green G is checked, accordingly, only the speed of the green G is measured, but undesirably, the slope speed of the green G is not measured at all.

SUMMARY OF THE INVENTION

Accordingly, the present invention has been made in view of the above-mentioned problems occurring in the related art, and it is an object of the present invention to provide a digital slope meter that is capable of allowing a moving distance and an isolated angle of a golf ball, which are measured at a given measurement point on a green, to be compared to those measured on another given measurement point on the green, thereby quantifying the slope speed of the green to permit a user like a golfer to recognize the quantified slope speed accurately and easily.

It is another object of the present invention to provide a digital slope meter that is capable of checking, when the moving distances and isolated angles of a golf ball are measured at two or more different measurement points, the degrees of slope of a given green in forward and backward directions or in left and right directions at the corresponding measurement points, so that when the slope speeds at the respective measurement points are compared to each other, the degrees of slope of the green at the respective measurement points are considered, thereby permitting a user like a golfer to recognize the slope speed of the green more accurately.

To accomplish the above-mentioned objects, according to the present invention, there is provided a digital slope meter including: a shaft extended in a longitudinal direction thereof and having a rolling groove formed on top thereof in the longitudinal direction thereof to allow a golf ball placed thereon to be moved down therealong, when the rear side thereof is tilted up in a state where the front side there is located on a green, and to then roll on the green from a discharging end formed at the front end thereof; and a measuring module located on the shaft to measure a moving distance and an isolated angle of the golf ball rolling on the green from the discharging end when the rear side of the shaft is tilted up.

According to the present invention, desirably, the measuring module includes: distance measuring members adapted to measure the moving distance of the golf ball rolling on the green from the discharging end; angle measuring members adapted to measure the isolated angle of the golf ball rolling on the green from the discharging end; and output members for displaying the moving distance and the isolated angle of the golf ball that are measured by the distance measuring members and the angle measuring members.

According to the present invention, desirably, the measuring module further includes a level adapted to measure a degree of slope of the green and to output the measured result through the output members.

According to the present invention, desirably, the measuring module includes protrusions extended forward from both side ends thereof in such a manner as to locate levels for measuring a degree of slope of the green therein.

According to the present invention, desirably, the distance measuring members and the angle measuring members perform measurements through any one of laser, infrared rays, and ultrasonic waves.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Hereinafter, a digital slope meter according to the present invention will be described in detail below with reference to the accompanying drawings.

Figure 1:
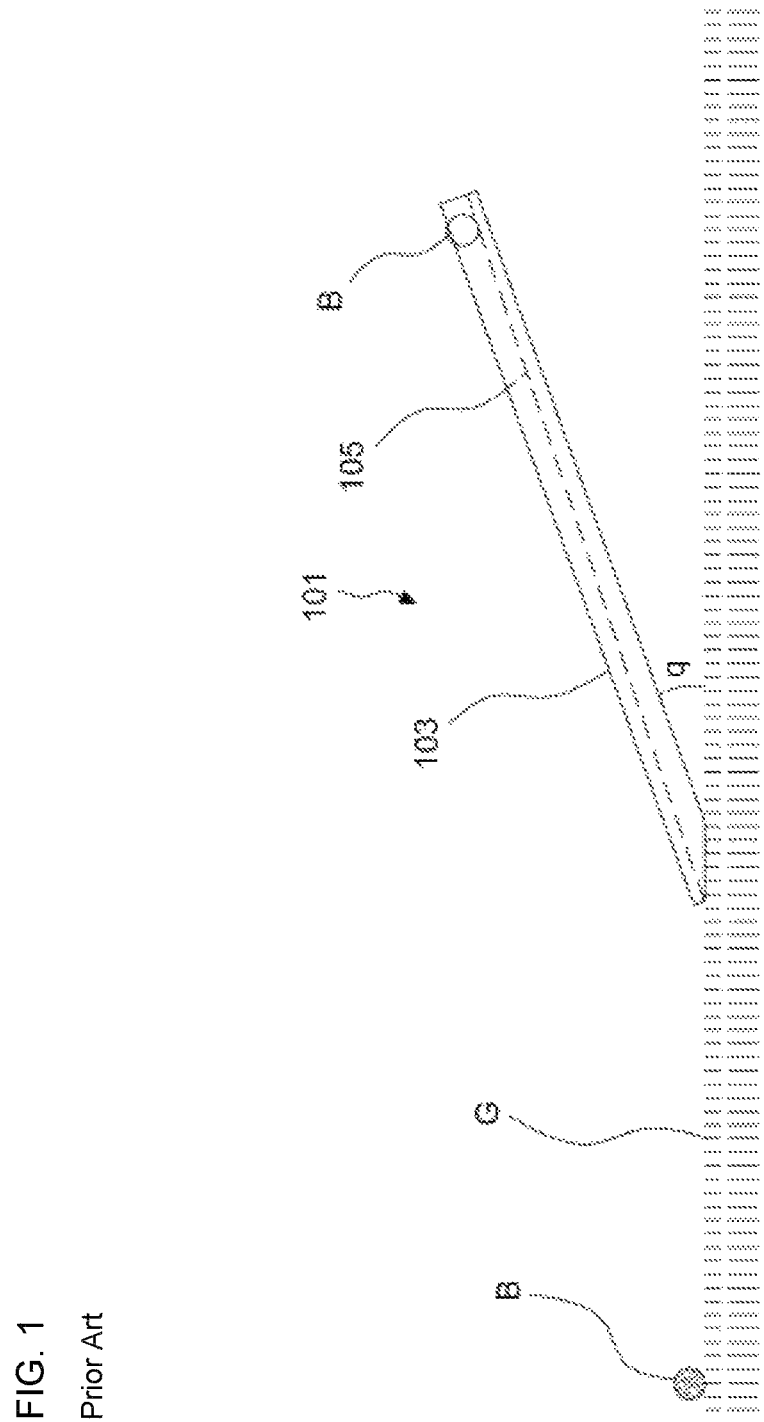
FIG. 1 is a side view showing a conventional Stimpmeter.
Figure 2:
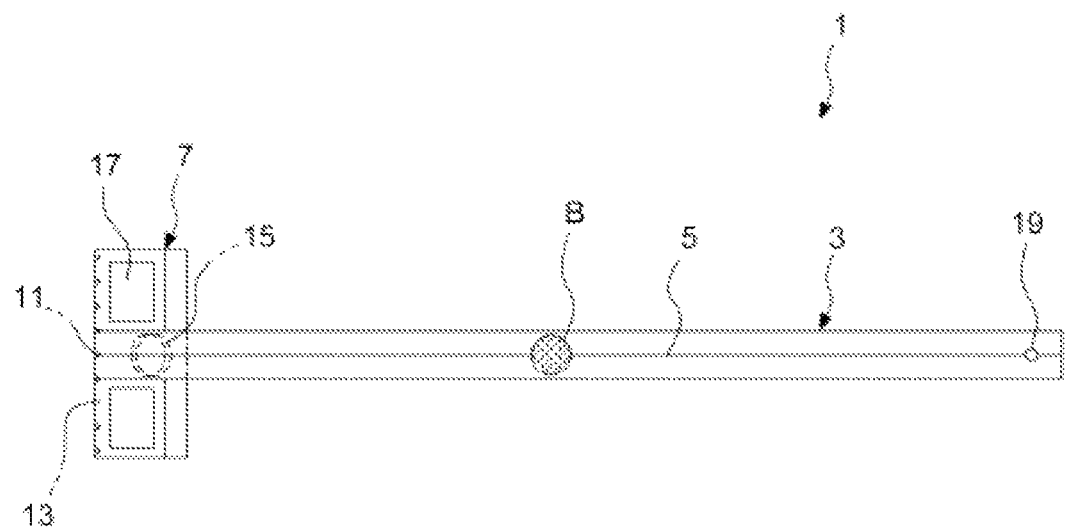
FIG. 2 is a plan view showing a digital slope meter according to an embodiment of the present invention.
Figure 3:
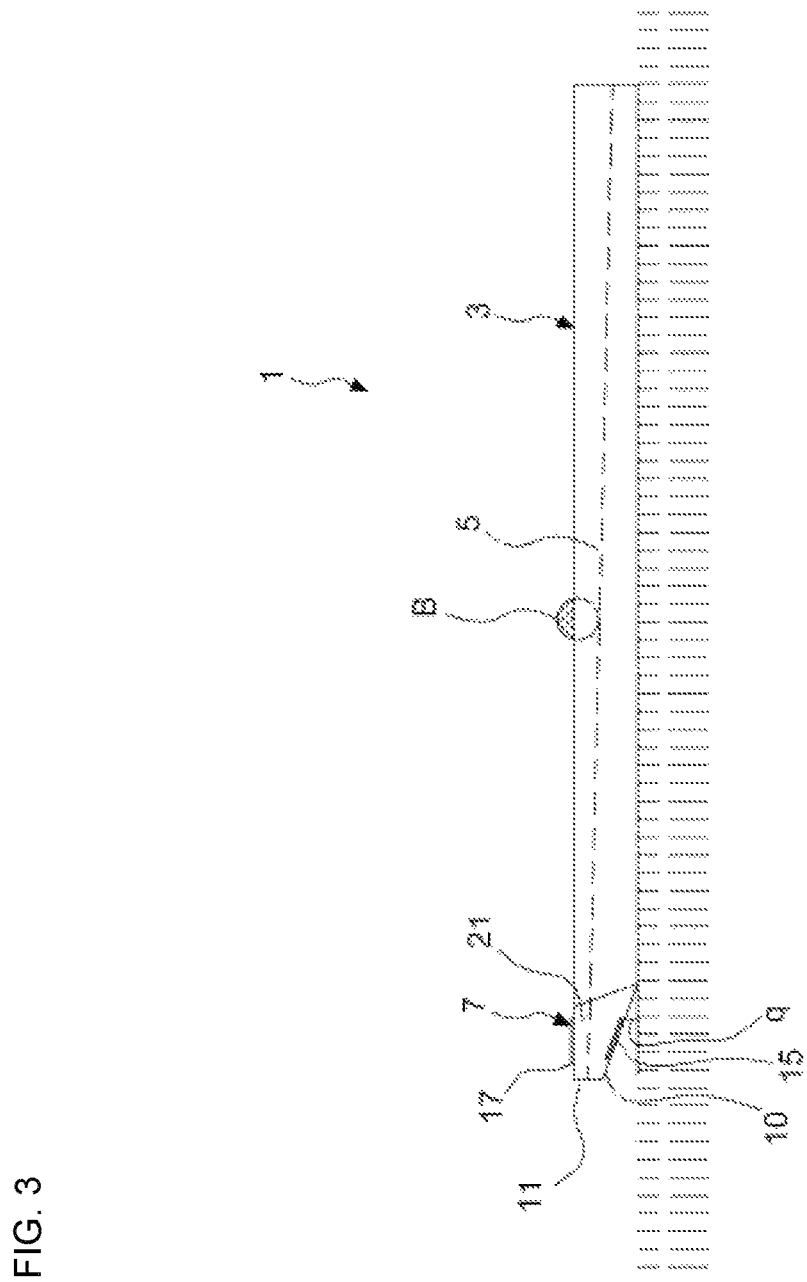
FIG. 3 is a side view showing the digital slope meter of FIG. 2.
Figure 4:
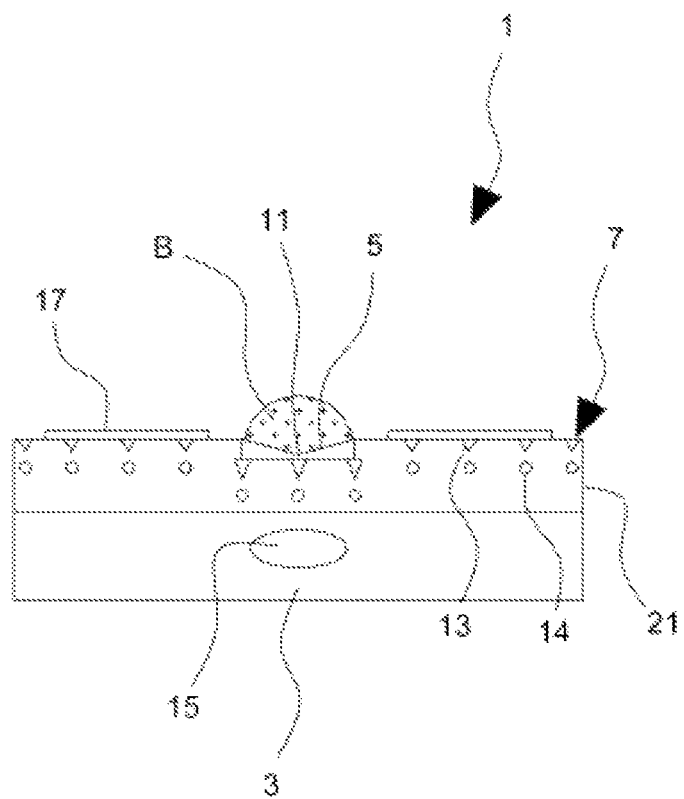
FIG. 4 is a front view showing the digital slope meter of FIG. 2.

According to the present invention, as shown in FIGS. 2 to 4, a digital slope meter 1 largely includes a shaft 3, a rolling groove 5, and a measuring module 7.

In this case, the shaft 3 constitutes a body of the slope meter 1, and as shown in FIGS. 2 to 4, the shaft 3 is made of an angled metal material extended long in a longitudinal direction. Since the slope meter 1 is easily carried or moved, however, the shaft 3 is desirably made of a lightweight material.

Figure 6:
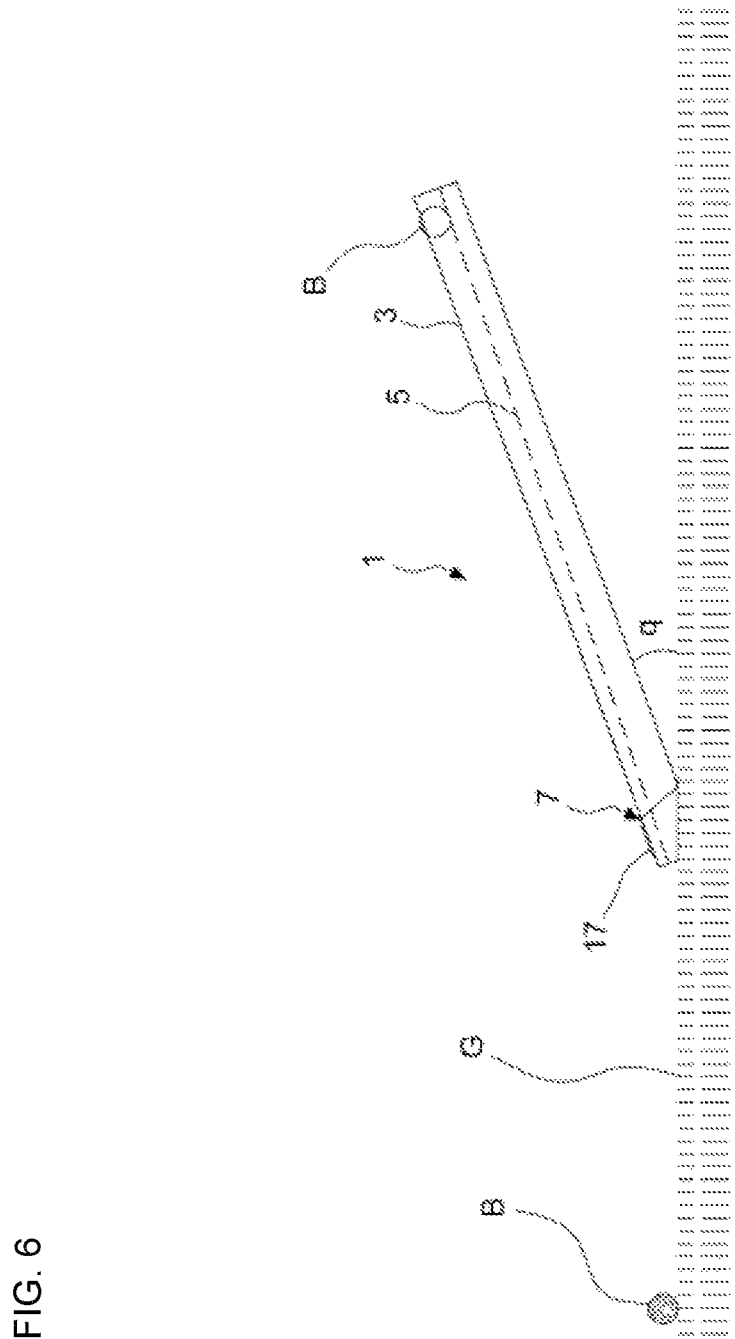
FIG. 6 is a side view showing the use state of the digital slope meter of FIG. 2.

Further, as shown in FIG. 6, the rear side of the shaft 3 is tilted up by a measuring angle q at a position where the slope speed of a green G is measured. In this case, the underside of the front end of the shaft 3 has a tilted surface 10 inclined to the measuring angle q in such a manner as to be parallel with the green G. So as to allow a golf ball B to be held at a position close to the rear end of the shaft 3 until the rear side of the shaft 3 is tilted up to the measuring angle q, further, a locking groove 19 is formed on the center of the rolling groove 5 at the position close to the rear end of the shaft 3, as shown in FIG. 2.

The rolling groove 5 is means for guiding the golf ball B along the shaft 3 when the slope speed of the green G is measured, so that the golf ball B rolls down the shaft 3, and as shown in FIGS. 2 to 4, the rolling groove 5 is formed along top of the shaft 3 in a longitudinal direction of the shaft 3. When the shaft 3 takes a measuring posture by tilting the rear side thereof up and placing the front side thereof on the green G so as to measure the slope speed of the green G, the golf ball B located at the locking groove 19 on the rear side of the shaft 3 moves down along the shaft 3 by means of its self weight, and next, the golf ball B rolls on the green G through a discharging end 11 formed on the front end of the shaft 3.

So as to prevent the golf ball B from moving to left and right sides, that is, in a transverse direction, while the golf ball B is rolling down, the rolling groove 5 desirably has the section shape of an inverted triangle as shown in FIG. 4. So as to reduce a frictional resistance applied to the golf ball B, however, the rolling groove 5 becomes desirably low in depth toward the front side thereof, as shown in FIG. 3.

Figure 5:
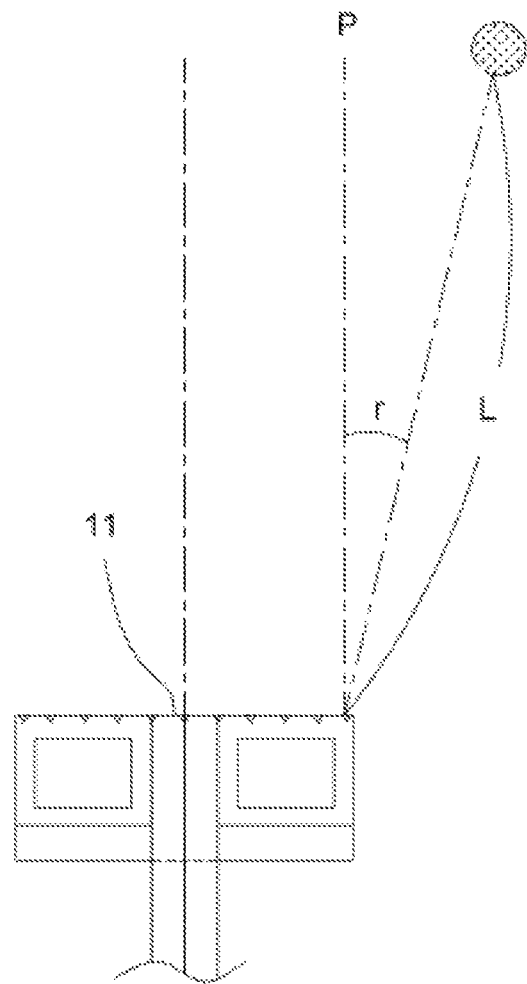
FIG. 5 is a partial plan view showing the use state of the digital slope meter of FIG. 2.

As shown in FIG. 5, the measuring module 7 is means for measuring a moving distance L and an isolated angle r of the golf ball B rolling on the green G after the golf ball B has been discharged from the shaft 3 and then displaying measuring results, and as shown in FIGS. 2 to 4, the measuring module 7 is attached to the front side of the shaft 3, particularly to the front end of the shaft 3. The measuring module 7 includes at least one or more distance measuring members 13 and at least one or more angle measuring members 14 which are adapted to in real time measure the moving distance and the isolated angle of the golf ball B discharged to top of the green G after the golf ball B has moved down along the rolling groove 5 when the rear side of the shaft 3 is tilted up. In this case, the distance measuring members 13 and the angle measuring members 14 are available with various digital devices, and for example, laser meters may be used as the distance measuring members 13 and the angle measuring members 14. Otherwise, distance or angle meters having infrared sensors or ultrasonic sensors may be used as the distance measuring members 13 and the angle measuring members 14. The reason why both of the isolated angle r and the moving distance L are measured is that if the moving distances L are different even in a state where the isolated angles r are the same as each other at different measuring points, slope speeds are different by the moving distances different from each other.

Like this, the measuring module 7 includes the distance measuring members 13, the angle measuring members 14, and output members 17 as will be described below.

In this case, the distance measuring members 13 serve to measure the moving distance of the golf ball B rolling on the green G from the discharging end 11, and as shown in FIGS. 2 to 4, desirably, the plurality of distance measuring members 13 is arranged in the transverse direction of the shaft 3. To do this, a head 21 is located on the front end of the shaft 3, and as shown, the head 21 is extended in the form of a linear line. Even if not shown, of course, the head 21 may be extended curvedly. Further, only one or two distance measuring members 13 may be located on a perpendicular line passing through the center of the discharging end 11, and in this case, the head 21 is not needed. If the plurality of distance measuring members 13 is provided, further, only one of the distance measuring members 13 is used to measure the moving distance of the golf ball B, and the used distance measuring member 13 has to be used when the speed of a reference green G is measured so as to compare the slope speed of the green G to be measured to the speed of the reference green G. In this case, the reference green G represents a flat green with no slope in every direction, that is, a green with zero slope. On the other hand, the respective laser distance meters desirably have a measuring range over a given width in left and right directions, for example, like the case where they are used for a speed gun.

Further, the angle measuring members 14 serve to measure the isolated angle of the golf ball B from the axial line of the shaft 2 or an imaginary line extended from the axial line when the golf ball B rolling on the green G stops after discharged from the discharging end 11, and as shown in FIG. 4, the angle measuring members 14 are located up or down on the same perpendicular lines of the distance measuring members 13 in such a manner as to correspond to the distance measuring members 13. In the same manner as the distance measuring members 13, desirably, the angle measuring members 14 are arranged in the transverse direction of the shaft 3. Otherwise, only one or two angle measuring members 14 may be located on a perpendicular line passing through the center of the discharging end 11. Accordingly, as shown in FIG. 5, the angle measuring members 14 measure the isolated angle r of the golf ball B from the imaginary line extended from the axial line of the shaft 3 or from an imaginary line P passing through the center of each angle measuring member 14 in a parallel relation with the imaginary line when the golf ball B rolling on the green G stops.

Further, the output members 17 serve to display the moving distance L and the isolated angle r of the golf ball B that are measured by the distance measuring members 13 and the angle measuring members 14 through images or voices, thereby allowing the measured values to be checked by a user. As shown in FIG. 2, desirably, displays as the output members 17 are located on the head 21 to display the measured values through images, but if the head 21 is not provided or if there is no space on the shaft 3 to install the displays, sound devices may be located to allow the measured values to be recognized by the user through voices. In this case, the displays are constituted of general LCDs, so that the moving distance value of the golf ball B which is measured through the distance measuring members 13 or the isolated angle value of the golf ball B which is measured by the angle measuring members 14 can be checked with the naked eye according to the command of a central control unit (not shown) of the measuring module 7.

On the other hand, as shown in FIGS. 2 and 3, the measuring module 7 further includes a level 15 adapted to measure a degree of slope of the green G whose slope speed is measured. The level 15 is desirably buriedly mounted on the tilted surface 10 formed on the front end of the shaft 3, but of course, the level 15 may be located on the underside of the shaft 3 that comes into contact with the green G when the digital slope meter lies on the green G. If the tilted surface 10 is formed, as shown, the level 15 measures the degree of slope of the green G when the tilted surface 10 comes into contact with the green G, and the measured degree of slope of the green G is outputted through the output members 17.

Figure 7:
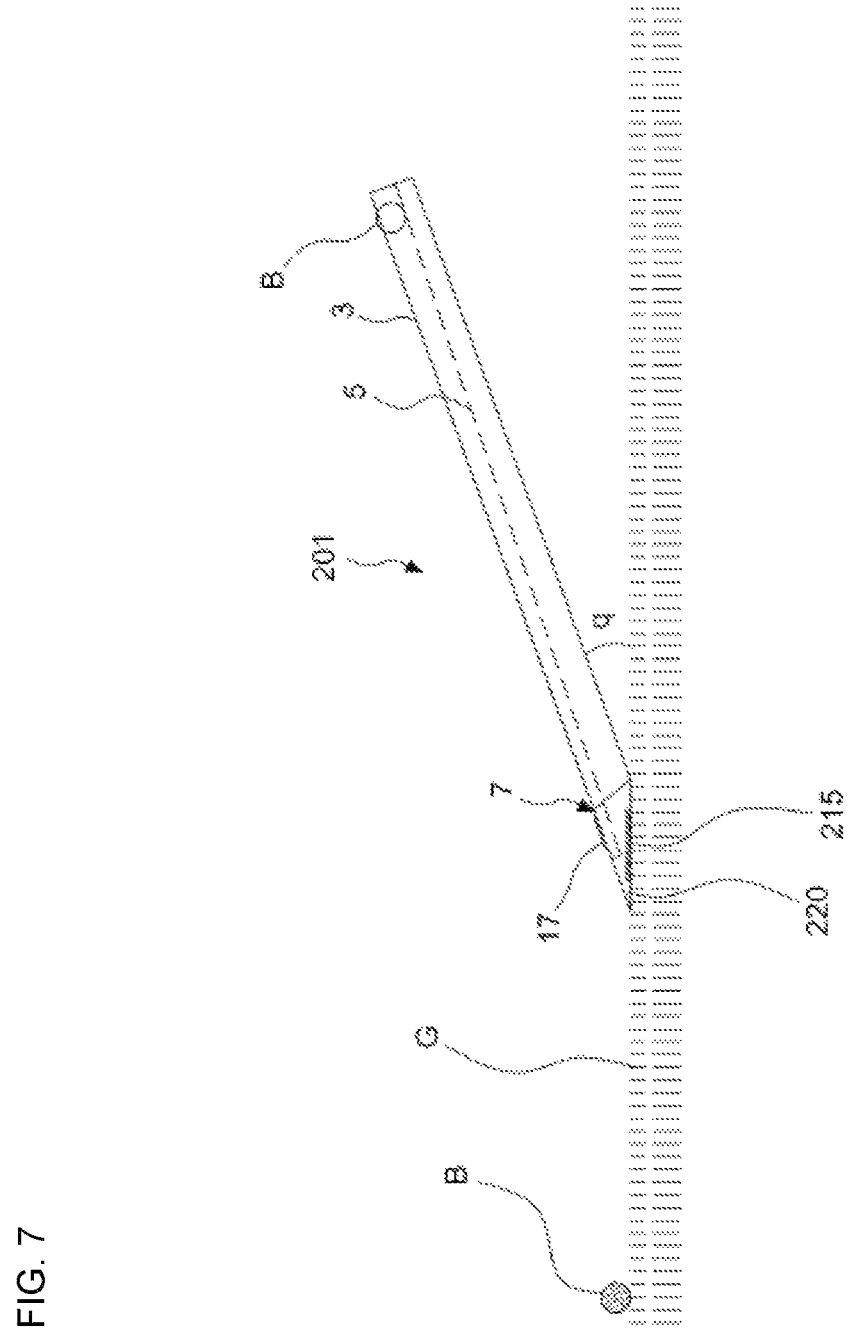
FIG. 7 is a side view showing a digital slope meter according to another embodiment of the present invention.
Figure 8:
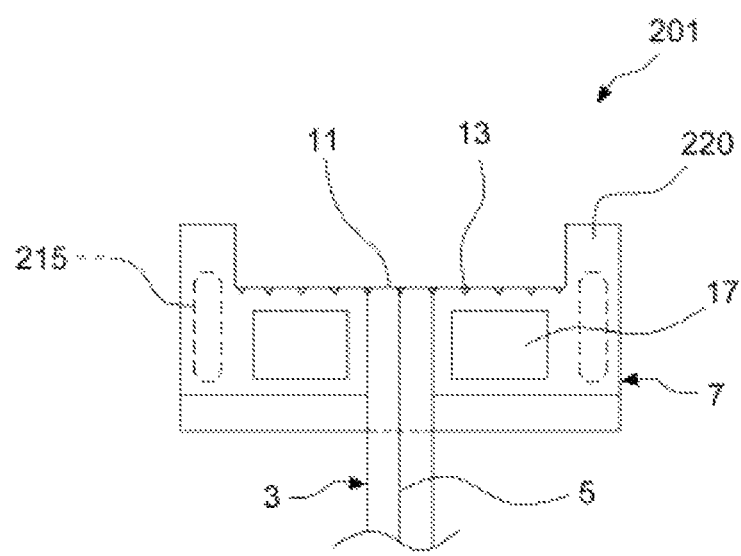
FIG. 8 is an enlarged partial plan view showing a measuring module of the digital slope meter of FIG. 7.

On the other hand, a digital slope meter 201 according to another embodiment of the present invention is shown in FIGS. 7 and 8.

In the same manner as the digital slope meter 1 as shown in FIG. 6, the digital slope meter 201 includes a shaft 3, a rolling groove 5, and a measuring module 7, and as shown in FIG. 7, if the rear side of the shaft 3 is tilted up by an angle q in such a manner as to place a golf ball B on the rear side of the rolling groove 5 in a state where the digital slope meter 1 is located on the green G, the golf ball B rolls down the rolling groove 5 and is thus discharged from a discharging end 11 formed on the front end of the shaft 3. After that, the moving distance and the isolated angle of the golf ball B moving along the green G are measured through distance measuring members 13 and angle measuring members 14, and in the same manner as the digital slope meter 1, the slope speed of the green G is displayed through output members 17.

However, as shown in FIGS. 7 and 8, the digital slope meter 201 is different from the digital slope meter 1 in that it is configured to have long protrusions 220 extended forward from both side ends of the measuring module 7 to allow levels 215 to be buriedly located on the bottom surfaces of the protrusions 220 in such a manner as to be extended in the longitudinal direction of the shaft 3. In this case, the levels 215 are extended longer in the longitudinal direction of the shaft 3 than the level 15 of the digital slope meter 1, and accordingly, the degree of slope of the green G at the point from which the golf ball B is discharged can be more accurately measured. As the levels 215 are located on the left and right sides, respectively, further, they can measure the degree of slope of the green G in the longitudinal direction of the shaft 3, that is, in the forward and backward directions of the shaft 3, so that through the comparison between the measured values, the levels 215 can measure the degree of slope of the green G in the longitudinal direction of the shaft 3, that is, in the forward and backward directions of the shaft 3 more accurately than the degree of slope of the green G in a thickness direction of the shaft 3, that is, in the left and right directions of the shaft 3.

Now, an explanation of an operation of the digital slope meter according to the present invention will be given.

So as to measure the slope speed of the green G by means of the digital slope meter 1 according to the present invention, as shown in FIG. 3, the digital slope meter 1 lies on the green G in a direction where a measurement is carried out. In this case, of course, the discharging end 11 is located toward the side to which the golf ball B rolls.

After that, as shown in FIG. 6, the golf ball B is placed on the locking groove 19 of the shaft 3, and the rear side of the shaft 3 is tilted up until the shaft 3 is inclined up to the measuring angle q. Next, if the tilted shaft 3 has the measuring angle q, the golf ball B rolls down the rolling groove 5 and stops at an arbitrary position of the green G, as shown in FIGS. 5 and 6. In this case, the level 15 coming into contact with the green G measures the degree of slope of the green G and displays the measured degree of slope. In the case where the digital slope meter 201 as shown in FIGS. 7 and 8 is used, the degree slope of the green G in the forward and backward direction of the shaft 3 at the point the golf ball B is discharged can be more accurately measured through the levels 215 extended in the forward and backward directions. Through the comparison between the measured values of the left and right levels 215, besides, the degrees of slope of the green G in the left and right directions of the shaft 3 can be more accurately measured.

If the golf ball B stops at the arbitrary position, as shown in FIGS. 5 and 6, the distance measuring members 13 sense the golf ball B through separate sensors or measure the moving distance of the golf ball B according to an external command generated by a separate operating switch. In this case, as shown in FIG. 5, the distance measuring members 13 measure a linear distance L up to the golf ball B therefrom. In the same manner as above, the angle measuring members 14 sense the golf ball B stopping through separate sensors or measure the isolated angle of the golf ball B from the imaginary line P, that is, the angle r between the line representing the linear distance L along which the golf ball B moves and the imaginary line P according to an external command generated by a separate operating switch.

Next, the moving distance L of the golf ball B that is measured by the distance measuring members 13 and the isolated angle r of the golf ball B that is measured by the angle measuring members 14 are immediately outputted to the user through the output members 17, and accordingly, the measured moving distance L and the measured isolated angle r can be checked in real time by the user. As a result, the degree of slope and the slope speed at a measurement point of the green G can be recognized by the user.

That is, the speed of the reference green G can be measured in advance by the digital slope meter 1, and in specific, the speed of the flat green G with no slope is checked with the moving distance L of the golf ball B.

Next, the moving distance L of the golf ball B and the isolated angle r of the golf ball B can be checked by the digital slope meter 1 at a given point of the green G, and as the degree of slope at the corresponding point is checked by the level 15, in this case, the moving distance L and the isolated angle r at the point where the green G has the degree of slope can be recognized.

If the degree of slope, the moving distance L, and the isolated angle r are measured again on another point of the green G, the measured values are compared to the measured values in the reference green G as well as the measured values just before the measurement to allow the slope speed at another point of the green G to be recognized by the user.

However, if a measurement point for the slope speed of the green G is determined irrespective of whether the slope speed is measured at any point of the green G, the digital slope meter 1 has to be placed at the measurement point in a direction where the highest degree of slope may be measured, thereby removing influences caused due to the difference in the degrees of slope varying according to the location directions for the measurement of the slope speed of the green G. In specific, the digital slope meter 1 is located in a direction where the degree of slope is highest in the slope of the green G, that is, in a direction toward a ridge, and since the degree of slope is highest in a direction of the imaginary line extended from the axial line of the shaft 3, in this case, the golf ball B discharged immediately from the discharging end 11 rolls in a straight line, without moving to the left and right sides, thereby just checking the degrees of slope in the left and right directions through the texture directions of the green G under no influences of the degrees of slope on the left and right sides.

For example, it is assumed that the moving distance of the golf ball B, which is measured on the reference green G by the digital slope meter 1, is 2 m. In this case, if a degree of slope measured at a first point of a specific green G is 5°, the moving distance L of the golf ball B is 2 m, and the isolated angle r is 15°, and if a degree of slope measured at a second point of the specific green G is 5°, the moving distance L of the golf ball B is 2.5 m, and the isolated angle r is 18°, it can be checked that the slope speed at the second point having the same degree of slope as the first point is faster than that at the first point. Also, the first and second points can be compared to the reference green G.

As described above, the digital slope meter according to the present invention can be configured to allow the linear moving distance of the golf ball discharged from the discharging end up to the position where the golf ball stops after rolling on the green and the isolated angle of the golf ball from the line extended from the shaft to be all measured so as to check the state of the green, thereby measuring the slope speed of the green more accurately when compared to the case where only the moving distance or isolated angle is measured.

In addition, the digital slope meter according to the present invention can be configured to allow the moving distance and isolated angle of the golf ball up to the position where the golf ball rolls on the green and then stops to be measured by means of the distance measuring members and the angle measuring members using digital devices like laser meters, thereby improving the accuracy in the measurements when compared to the measurements obtained manually and performing the measuring process more conveniently.

Moreover, the digital slope meter according to the present invention can be configured to allow the degrees of slope in the forward and backward directions or in the left and right directions at the measurement point to be measured by means of the level located on the center of the measuring module or the levels located on the protrusions extended form both side ends of the measuring module, thereby more accurately recognizing the slope speed of the green in consideration of the degree of slope of the green when the moving distance and the isolated angle of the golf ball are checked.

Further, the digital slope meter according to the present invention can be configured to allow the degree of slope of the green to be considered or not to allow the degree of slope of the green to be considered according to the direction or posture thereof on the green, when the moving distance and the isolated angle of the golf ball are checked, thereby appropriately changing the direction or posture thereof on the green to conveniently check the slope speed of the green. For example, if the digital slope meter is located in a direction where the degree of slope is highest at the measurement point, the slope speed of the green can be checked, while not considering the difference in the degrees of slope in the left and right sides, so that the slope speeds at the two points where the degrees of slope are the same as each other are compared to each other. Contrarily, if the digital slope meter is located toward a hole cup, it is most likely that the digital slope meter is not located in a direction of a ridge having the highest degree of slope, and there is a difference in degrees of slope in the left and right sides, accordingly, so that even if the degrees of slope are the same as each other, the slope speeds of the green can be checked in consideration of the influence of the degrees of slope when the measurement results of the two measurement points are compared to each other.

Additionally, the digital slope meter according to the present invention can be configured to allow the degrees of slope in the left and right directions as well as the degrees of slope in the forward and backward directions to be measured by means of the levels located on both side ends of the measuring module, in the case where the degrees of slope in the left and right sides of the green are different, so that the degrees of slope in the left and right directions are compared to each other, thereby checking the slope speed of the green in consideration of both of the degrees of slope in the forward and backward directions and the degrees of slope in the left and right directions.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A digital slope meter comprising:
   a shaft (3) extended in a longitudinal direction thereof and having a rolling groove (5) formed on top thereof in a longitudinal direction thereof to allow a golf ball (B) placed thereon to be moved down therealong, when a rear side (20) thereof is tilted up in a state where a front side (30) thereof is located on a green (G), and to then roll on the green (G) from a discharging end (11) formed at a front end (40) thereof; and
   a measuring module (7) located on the shaft (3) to measure a moving distance (L) and an isolated angle of the golf ball (B) rolling on the green (G) from the discharging end (11) when the rear side of the shaft (3) is tilted up.

2. The digital slope meter according to claim 1, wherein the measuring module (7) comprises:
   distance measuring members (13) adapted to measure a moving distance of the golf ball (B) rolling on the green (G) from the discharging end (11);
   angle measuring members (14) adapted to measure the isolated angle of the golf ball (B) rolling on the green (G) from the discharging end (11); and
   output members (17) for displaying the moving distance and the isolated angle of the golf ball (B) that are measured by the distance measuring members (13) and the angle measuring members (14).

3. The digital slope meter according to claim 2, wherein the measuring module (7) further comprises a level (15) adapted to measure a degree of slope of the green (G) and output a measured result through the output members (17).

4. The digital slope meter according to claim 3, wherein the measuring module (7) comprises protrusions (220) extended forward from side ends (200) thereof in such a manner as to locate levels (215) for measuring a degree of slope of the green (G) therein.

5. The digital slope meter according to claim 2, wherein the distance measuring members (13) and the angle measuring members (14) perform measurements through any one of laser, infrared rays, and ultrasonic waves.

\* \* \* \* \*